United States Patent
Chang et al.

(10) Patent No.: US 8,130,607 B2
(45) Date of Patent: Mar. 6, 2012

(54) METHOD AND APPARATUS FOR DETECTING BURST CUTTING AREA ON OPTICAL DISC

(75) Inventors: Chia-Ming Chang, Hsinchu (TW); Chun-Nan Liu, Hsinchu (TW); Ping-Chiang Yang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 84 days.

(21) Appl. No.: 12/565,357

(22) Filed: Sep. 23, 2009

(65) Prior Publication Data

US 2010/0135137 A1    Jun. 3, 2010

(30) Foreign Application Priority Data

Nov. 28, 2008  (TW) ............................... 97146350 A

(51) Int. Cl.
*G11B 5/58* (2006.01)
*G11B 15/00* (2006.01)
*G11B 5/09* (2006.01)
*G11B 20/18* (2006.01)
*G11B 20/14* (2006.01)

(52) U.S. Cl. .................. 369/47.48; 369/53.2; 369/52.1; 369/53.16; 369/59.19; 369/59.2

(58) Field of Classification Search .............. 369/47.48, 369/52.1, 53.16, 53.2, 59.19, 59.2
See application file for complete search history.

(56) References Cited

U.S. PATENT DOCUMENTS

| | | | |
|---|---|---|---|
| 6,950,379 B2 * | 9/2005 | Yen et al. ..................... | 369/52.1 |
| 7,006,415 B2 | 2/2006 | Hou et al. | |
| 2004/0066723 A1 * | 4/2004 | Hou et al. .................. | 369/53.34 |
| 2005/0157606 A1 * | 7/2005 | Hu et al. ......................... | 369/43 |
| 2005/0286369 A1 * | 12/2005 | Yen et al. .................... | 369/47.26 |
| 2006/0181998 A1 | 8/2006 | Chen et al. | |
| 2007/0115777 A1 * | 5/2007 | Chen ........................... | 369/52.1 |

* cited by examiner

*Primary Examiner* — Joseph Feild
*Assistant Examiner* — Aneeta Yodichkas
(74) *Attorney, Agent, or Firm* — WPAT, P.C.; Justin King

(57) ABSTRACT

An apparatus for detecting burst cutting areas on optical discs includes an optical pickup head, a front-end processing unit, a sync pattern detector, a channel clock recovery device, and a data demodulator. The front-end processing unit generates a BCA signal in response to a radio frequency signal. The sync pattern detector counts the BCA signal according to a reference clock, detects a sync pattern of the BCA signal and outputs a channel bit length counting value. The channel clock recovery device generates a channel clock according to the reference clock and the channel bit length counting value. The data demodulator transfers the BCA signal into a BCA data according to the channel clock. The sync pattern detector continuously counts the BCA signal and continuously outputs a plurality of counting values, so that the sync pattern of the BCA signal can be determined according to at least three sequential counting values.

11 Claims, 6 Drawing Sheets

|  | 5 Bytes | | | | |
|---|---|---|---|---|---|
| 1 Bytes | 4 Bytes | | | | |
| SB$_{BCA,-1}$ | BCA-Preable (AlL00h) | | | | One Row |
| SB$_{BCA,0}$ | I$_{0,0}$ | I$_{0,1}$ | I$_{0,2}$ | I$_{0,3}$ | |
| SB$_{BCA,0}$ | I$_{0,4}$ | I$_{0,5}$ | I$_{0,6}$ | I$_{0,7}$ | |
| SB$_{BCA,0}$ | I$_{0,8}$ | I$_{0,9}$ | I$_{0,10}$ | I$_{0,11}$ | Four Rows |
| SB$_{BCA,0}$ | I$_{0,12}$ | I$_{0,13}$ | I$_{0,14}$ | I$_{0,15}$ | |
| SB$_{BCA,1}$ | C$_{0,0}$ | C$_{0,1}$ | C$_{0,2}$ | C$_{0,3}$ | |
| SB$_{BCA,1}$ | C$_{0,4}$ | C$_{0,5}$ | C$_{0,6}$ | C$_{0,7}$ | |
| SB$_{BCA,1}$ | C$_{0,8}$ | C$_{0,9}$ | C$_{0,10}$ | C$_{0,11}$ | Four Rows |
| SB$_{BCA,1}$ | C$_{0,12}$ | C$_{0,13}$ | C$_{0,14}$ | C$_{0,12}$ | |
| SB$_{BCA,2}$ | I$_{1,0}$ | I$_{1,1}$ | I$_{1,2}$ | I$_{1,3}$ | |
| SB$_{BCA,2}$ | I$_{1,4}$ | I$_{1,5}$ | I$_{1,6}$ | I$_{1,7}$ | |
| SB$_{BCA,2}$ | I$_{1,8}$ | I$_{1,9}$ | I$_{1,10}$ | I$_{1,11}$ | Four Rows |
| SB$_{BCA,2}$ | I$_{1,12}$ | I$_{1,13}$ | I$_{1,14}$ | I$_{1,12}$ | |
| SB$_{BCA,3}$ | C$_{1,0}$ | C$_{1,1}$ | C$_{1,2}$ | C$_{1,3}$ | |
| SB$_{BCA,3}$ | C$_{1,4}$ | C$_{1,5}$ | C$_{1,6}$ | C$_{1,7}$ | |
| SB$_{BCA,3}$ | C$_{1,8}$ | C$_{1,9}$ | C$_{1,10}$ | C$_{1,11}$ | Four Rows |
| SB$_{BCA,3}$ | C$_{1,12}$ | C$_{1,13}$ | C$_{1,14}$ | C$_{1,15}$ | |
| SB$_{BCA,4}$ | I$_{2,0}$ | I$_{2,1}$ | I$_{2,2}$ | I$_{2,3}$ | |
| SB$_{BCA,4}$ | I$_{2,4}$ | I$_{2,5}$ | I$_{2,6}$ | I$_{2,7}$ | |
| SB$_{BCA,4}$ | I$_{2,8}$ | I$_{2,9}$ | I$_{2,10}$ | I$_{2,11}$ | Four Rows |
| SB$_{BCA,4}$ | I$_{2,12}$ | I$_{2,13}$ | I$_{2,14}$ | I$_{2,15}$ | |
| SB$_{BCA,5}$ | C$_{2,0}$ | C$_{2,1}$ | C$_{2,2}$ | C$_{2,3}$ | |
| SB$_{BCA,5}$ | C$_{2,4}$ | C$_{2,5}$ | C$_{2,6}$ | C$_{2,7}$ | |
| SB$_{BCA,5}$ | C$_{2,8}$ | C$_{2,9}$ | C$_{2,10}$ | C$_{2,11}$ | Four Rows |
| SB$_{BCA,5}$ | C$_{2,12}$ | C$_{2,13}$ | C$_{2,14}$ | C$_{2,15}$ | |
| SB$_{BCA,6}$ | I$_{3,0}$ | I$_{3,1}$ | I$_{3,2}$ | I$_{3,3}$ | |
| SB$_{BCA,6}$ | I$_{3,4}$ | I$_{3,5}$ | I$_{3,6}$ | I$_{3,7}$ | |
| SB$_{BCA,6}$ | I$_{3,8}$ | I$_{3,9}$ | I$_{3,10}$ | I$_{3,11}$ | Four Rows |
| SB$_{BCA,6}$ | I$_{3,12}$ | I$_{3,13}$ | I$_{3,14}$ | I$_{3,15}$ | |
| SB$_{BCA,7}$ | C$_{3,0}$ | C$_{3,1}$ | C$_{3,2}$ | C$_{3,3}$ | |
| SB$_{BCA,7}$ | C$_{3,4}$ | C$_{3,5}$ | C$_{3,6}$ | C$_{3,7}$ | |
| SB$_{BCA,7}$ | C$_{3,8}$ | C$_{3,9}$ | C$_{3,10}$ | C$_{3,11}$ | Four Rows |
| SB$_{BCA,7}$ | C$_{3,12}$ | C$_{3,13}$ | C$_{3,14}$ | C$_{3,15}$ | |
| SB$_{BCA,-2}$ | | | | | |

FIG.1B
PRIOR ART

METHOD AND APPARATUS FOR DETECTING BURST CUTTING AREA ON OPTICAL DISC

FIELD OF THE INVENTION

The present invention relates to a method and a related apparatus for detecting optical discs, and more particularly, to a method and a related apparatus for detecting burst cutting areas on optical discs.

BACKGROUND OF THE INVENTION

Please refer to FIG. 1A. FIG. 1A is a diagram illustrating a burst cutting area (which is called as BCA in the following descriptions) on an optical disc. The BCA is a circular and is near to a center hole of the optical disc, wherein the pattern of the BCA is similar to a bar code and alternates bright with dark. Generally speaking, The BCA is an area used for recording copyright-related information on the optical disc, which records essential messages capable of decoding contents of the optical disc. As a result, the BCA is widely applied to an optical disc having copyright protection. For a latest blue-ray disc, the BCA is more than an essential protection mechanism. Hence, how to quickly and accurately decode the data in the BCA has become an important problem that needs be solved by disc drive manufactures.

Please refer to FIG. 1B. FIG. 1B is a diagram illustrating the structure of a BCA defined in the blue-ray disc specification. Each row has five bytes, wherein a first byte of each row is a sync byte $SB_{BCA}$ and the sync byte $SB_{BCA}$ of each row has the same sync pattern. Based on the blue-ray disc specification, the first sync byte ($SB_{BCA,-1}$) is the beginning of the whole BCA, so that the whole BCA can be decoded only when the first sync byte ($SB_{BCA,-1}$) is first detected. In addition, based on the blue-ray disc specification, a BCA signal with 5 T, 3 T, 2 T, and 4 T is generated when the laser beam emitted from the optical pickup head is projected on the sync pattern. In other words, when a pattern with 5 T, 3 T, 2 T, and 4 T is appeared in the BCA signal, it represents that the sync pattern is detected in the BCA signal.

Since the BCA signal is affected by the rotating speed of the spindle motor, the conventional methods usually find out an accurate sampling clock first and then utilize the sampling clock to perform the follow-up sync pattern detection in the BCA signal and the decoding of the BCA signal in order to accurately sample the BCA signal and the sync pattern of the BCA signal.

A sampling clock generator for BCA data decoding has been disclosed in the U.S. Pat. No. 7,006,415. As shown in FIG. 2, the sampling clock generator 41 receives a spindle-motor-speed indicating signal FG and a BCA reproducing signal, and then generates a sampling clock in response to the spindle-motor-speed indicating signal FG and the BCA reproducing signal. After that, the sampling clock is inputted to a BCA channel bit generator 42 and a BCA decoder 43. As a result, the BCA channel bit generator 42 is capable of finding out the sync pattern of the BCA signal according to the sampling clock and accurately generating a BCA channel bit to the BCA decoder 43. The BCA decoder 43 is capable of generating a BCA data bit according to the sampling clock and the BCA channel bit.

Obviously, the spindle motor must be fixed at a designated rotating speed in the above-mentioned conventional method, and thus the sampling clock can be calculated according to a relationship between the BCA reproducing signal and the rotating speed. However, the frequency variations of the sampling clock are very small and will be easily affected by the optical disc or the spindle motor.

A method and apparatus for generating a sampling clock for a burst cutting area of an optical disc has been disclosed in the US Publication No. 20060181998. As shown in FIG. 3, the sampling clock generating device 400 includes a BCA signal reproduction device 410, a detecting device 420, a computing unit 430, a clock generator 440, and a control unit 450.

After a radio frequency signal passes through the BCA signal reproduction device 410, a BCA reproducing signal BRS can be generated to the detecting device 420. A counter 422 of the detecting device 420 then continuously counts the BCA reproducing signal BRS according to a reference clock REFCLK to obtain a counting value, and the counting value is stored in a register 424 of the detecting device 420. In addition, when the counting value of the counter 422 is greater than the counting value stored in the register 424, the counting value stored in the register 424 will be updated. That is, the counting value stored in the register 424 is the largest value. Moreover, based on the blue-ray disc specification, the maximum channel bit length of the BCA reproducing signal BRS is 5 T.

For example, assume that the counting value stored in the register 424 is 100. The counting value is divided by 5 by using the computing unit 430 (i.e., 100/5=20), so as to output a value equaling 20 to the clock generator 440. The clock generator 440 obtains a period of the channel bit length with 1 T equaling twenty periods of the reference clock REFCLK, and generates the sampling clock. Only after the sampling clock is obtained, the sync pattern detection can be performed according to the sampling clock.

SUMMARY OF THE INVENTION

The present invention provides an apparatus and method for detecting burst cutting areas on optical discs. The apparatus is capable of detecting a sync pattern of a BCA signal and simultaneously generating a channel clock when the sync pattern is detected. After that, the apparatus is capable of demodulating the BCA signal to generate a BCA data according to the channel clock.

According to an exemplary embodiment of the present invention, an apparatus for detecting a burst cutting area on an optical disc is provided. The apparatus consists of an optical pickup head, a front-end processing unit, a sync pattern detector, a channel clock recovery device, and a data demodulator. The optical pickup head is capable of emitting a laser beam to the burst cutting area of the optical disc and obtaining a radio frequency signal. The front-end processing unit receives the radio frequency signal and generates a BCA signal in response to the radio frequency signal. The sync pattern detector counts the BCA signal according to a reference clock and is capable of detecting a sync pattern of the BCA signal and outputting a channel bit length counting value. The channel clock recovery device receives the reference clock and the channel bit length counting value, and generates a channel clock according to the reference clock and the channel bit length counting value. The data demodulator receives the channel clock and the BCA signal, and transfers the BCA signal into a BCA data according to the channel clock. The sync pattern detector is capable of continuously counting the BCA signal and continuously outputting a plurality of counting values, so that the sync pattern of the BCA signal is able to be determined according to at least three sequential counting values.

In addition, according to another exemplary embodiment of the present invention, a method for detecting a burst cutting area on an optical disc is provided. The method includes the following steps: continuously sampling a BCA signal according to a reference clock, and continuously outputting a first counting value, a second counting value and a third counting value; and determining a sync pattern of the BCA signal according to a relationship between the first counting value, the second counting value and the third counting value.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1B is a diagram illustrating a structure of a BCA defined in the blue-ray disc specification;

DETAILED DESCRIPTION OF THE PREFERRED EMBODIMENT

Since the conventional methods usually find out the sampling clock of the BCA signal and then detect the sync pattern of the BCA signal according to the sampling clock, they have a lower efficiency and complicated circuits are required. On the other hand, the method and apparatus for detecting a sync pattern of a BCA on an optical disc disclosed in the present invention detects the sync pattern of the BCA signal and simultaneously generates a channel clock when the sync pattern is detected. Therefore, some complicated circuits can be saved, which can effectively reduce the circuit size. In addition, a spindle motor provided with rotating speed information is not required if the mechanism disclosed in the present invention is applied to optical storage devices, which can reduce the manufacturing cost.

Figure 1A:
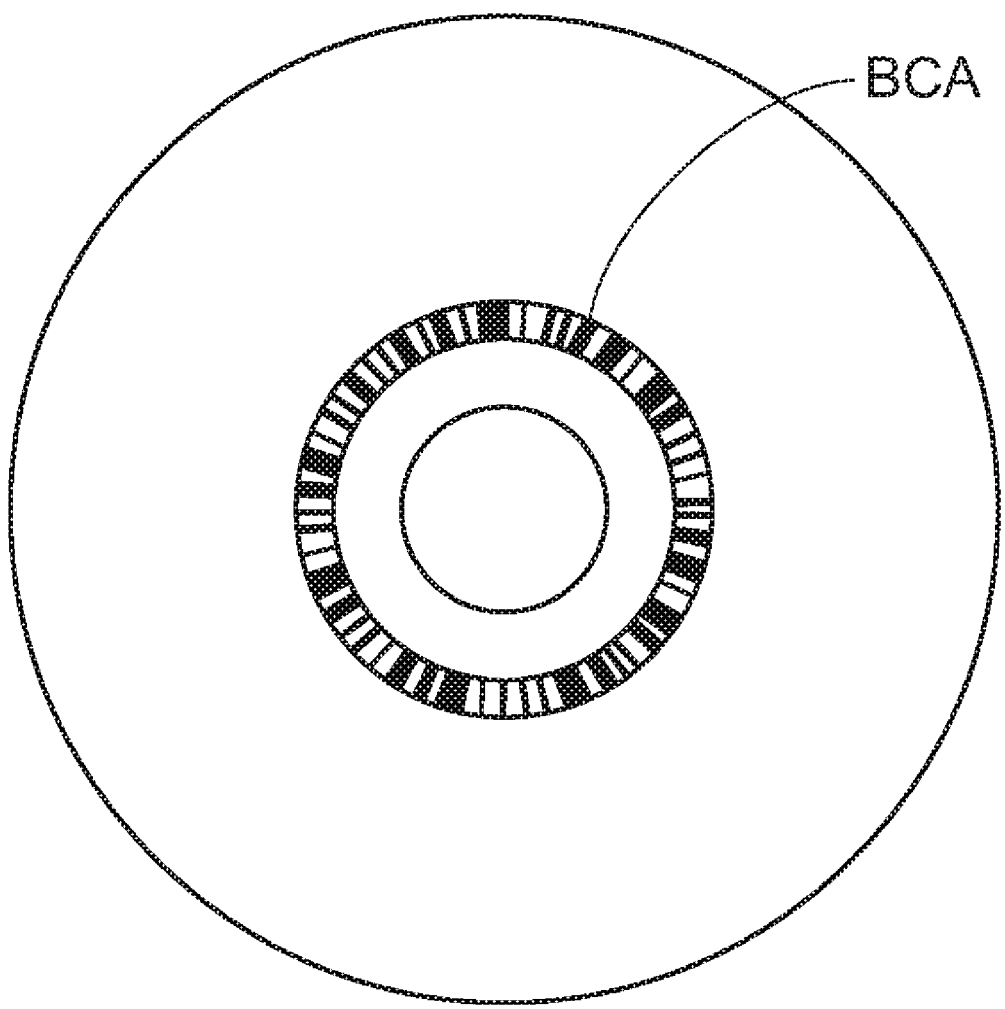
FIG. 1A is a diagram illustrating a burst cutting area on an optical disc.
Figure 2:
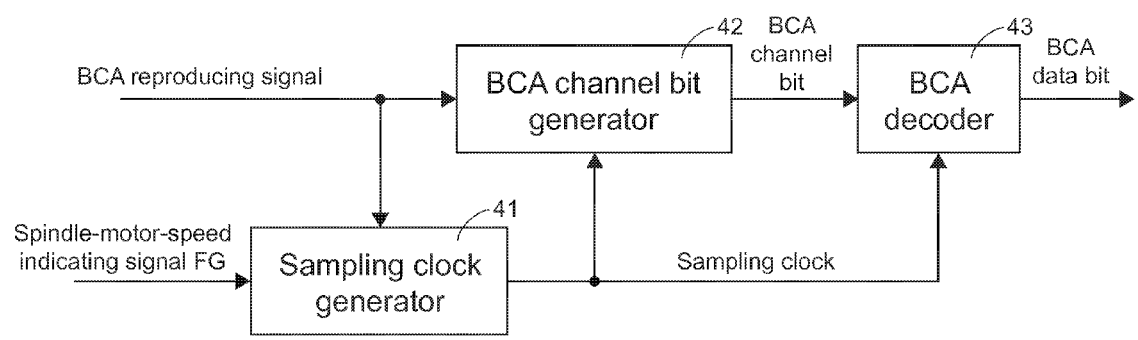
FIG. 2 is a diagram illustrating a conventional sampling clock generator for decoding the data of a BAC according to prior art.
Figure 3:
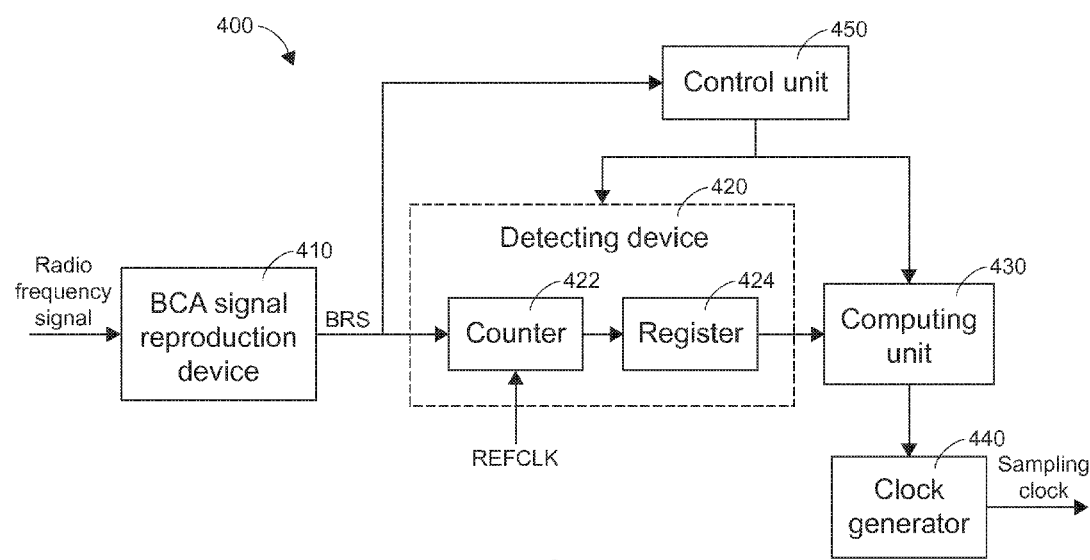
FIG. 3 is a diagram illustrating a conventional sampling clock generating device of a BCA on an optical disc according to prior art.
Figure 4:
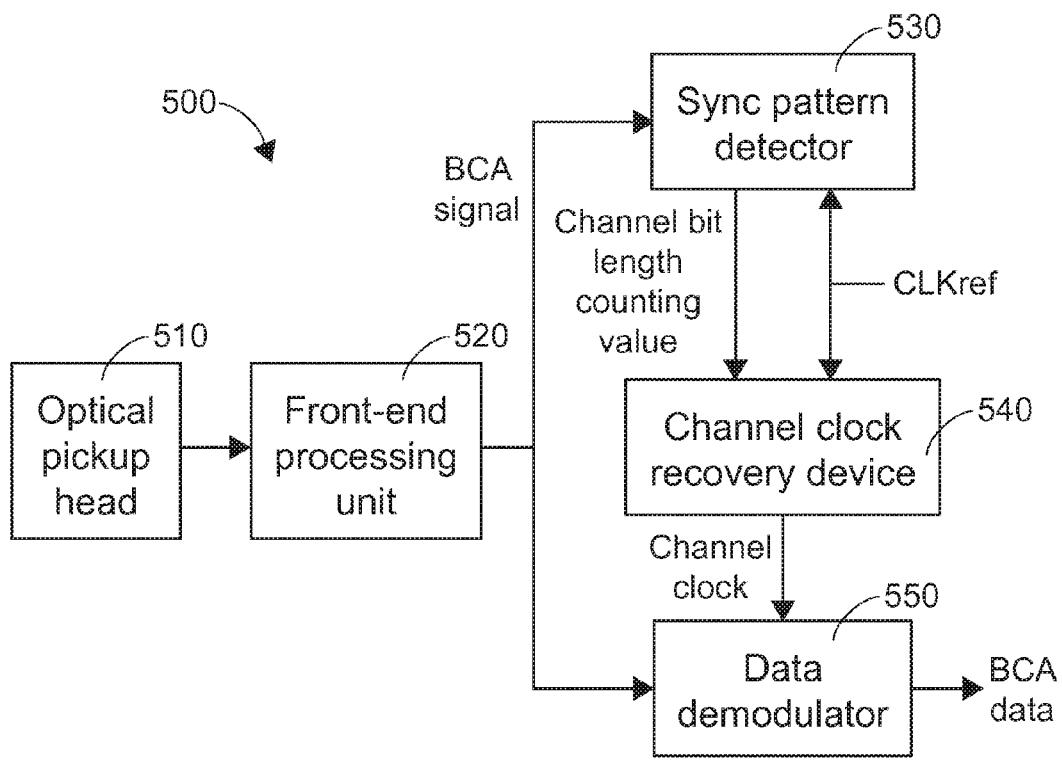
FIG. 4 is a diagram illustrating an apparatus for detecting a sync pattern of a BCA on an optical disc according to an embodiment of the present invention.

Please refer to FIG. 4. FIG. 4 is a diagram illustrating an apparatus for detecting a sync pattern in a BCA on an optical disc according to an embodiment of the present invention. The apparatus 500 consists of an optical pickup head 510, a front-end processing unit 520, a sync pattern detector 530, a channel clock recovery device 540, and a data demodulator 550. The optical pickup head 510 is capable of emitting a laser beam to a BCA of an optical disc and obtaining a radio frequency (RF) signal. The front-end processing unit 520 then receives the radio frequency signal and generates a BCA signal in response to the radio frequency signal. In the meanwhile, the BCA signal is inputted to the sync pattern detector 530 and the data demodulator 550. The sync pattern detector 530 can find out the sync pattern according to the BCA signal and a reference clock $CLK_{ref}$. When the sync pattern is detected, the sync pattern detector 530 outputs a channel bit length counting value to the channel clock recovery device 540. The channel clock recovery device 540 generates a channel clock to the data demodulator 550 according to the channel bit length counting value and the reference clock $CLK_{ref}$, so that the data demodulator 550 can immediately transfer the BCA signal into a BCA data.

Based on the blue-ray disc specification, the radio frequency signal is generated when the laser beam emitted from the optical pickup head 510 is radiated on the sync pattern. After that, the BCA signal with 5 T, 3 T, 2 T, and 4 T can be generated by processing the radio signal via the front-end processing unit 520. In other words, when a pattern with 5 T, 3 T, 2 T, and 4 T is appeared in the BCA signal, it represents that the sync pattern is detected. For further analysis, a signal having a continuous pattern with 5 T, 3 T, 2 T, and 4 T is impossible to be appeared in the BCA signal except for the sync pattern of the BCA signal. Hence, such feature is adopted in the present invention. When the continuous pattern with 5 T, 3 T, 2 T, and 4 T is appeared in the BCA signal, it is determined as the sync pattern.

Figure 5:
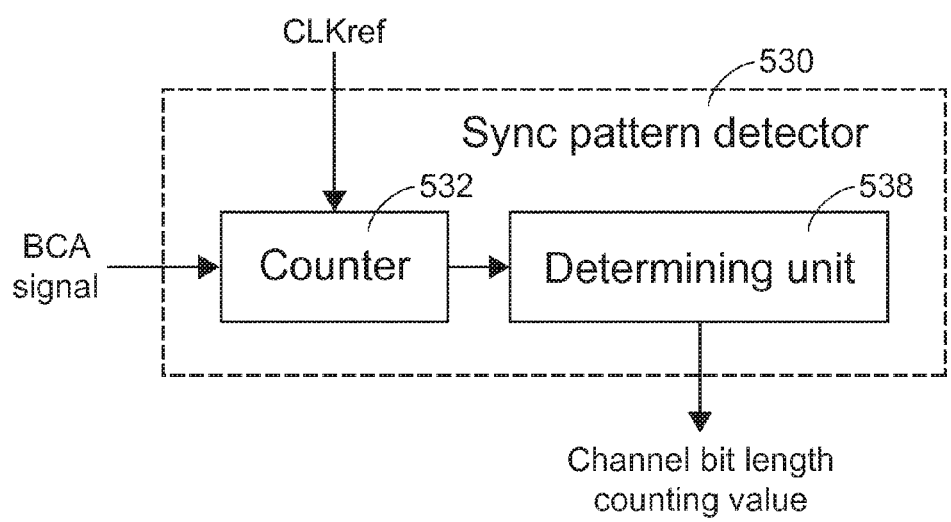
FIG. 5 is a diagram showing an embodiment of a sync pattern detector applicable to the apparatus of FIG. 4.

Please refer to FIG. 5. FIG. 5 is a diagram showing an embodiment of a sync pattern detector applicable to the apparatus 400 of FIG. 4. The sync pattern detector 530 consists of a counter 532 and a determining unit 538. The counter 532 continuously counts the BCA signal according to the reference clock $CLK_{ref}$, and outputs the corresponding counting values to the determining unit 538. The determining unit 538 determines whether the sync pattern is appeared in the BCA signal according to three sequential counting values. When the sync pattern is detected, the determining unit 538 outputs the channel bit length counting value to the channel clock recovery device 540.

Figure 6:
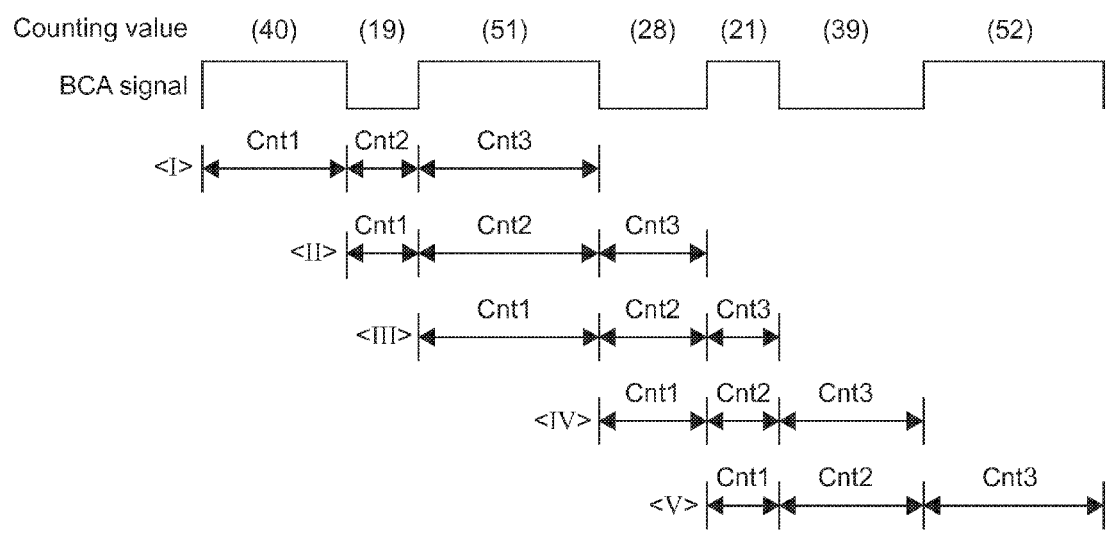
FIG. 6 is a diagram showing an embodiment of the BCA signal.

Please refer to FIG. 6. FIG. 6 is a diagram showing an embodiment of the BCA signal, wherein high logic levels and low logic levels with different timing lengths are appeared in the BCA signal. According to an embodiment of the present invention, the counter 532 continuously samples the high logic levels and low logic levels in the BCA signal according to the reference clock $CLK_{ref}$. In other words, when the BCA signal changes from the high logic level to the low logic level, the counter 532 outputs the counting values of the high logic level and re-counts the low logic level. Similarly, when the BCA signal changes from the low logic level to the high logic level, the counter 532 outputs the counting values of the low logic level and re-counts the high logic level. That is, the counter 532 continuously outputs the counting values to the determining unit 538 during a transformation between high/low logic levels of the BCA signal. After three sequential counting values are received by the determining unit 538, it immediately performs the sync pattern detection.

For example, the determining unit 538 can determine whether the BCA signal has the sync pattern by reference to a ratio of the three sequential counting values, e.g. Cnt1, Cnt2, and Cnt3, equaling 5:3:2 or not. When the ratio of the three sequential counting values Cnt1, Cnt2, and Cnt3 is equal to 5:3:2, the BCA signal is determined to have the sync pattern. Otherwise, the BCA signal is determined to have no sync pattern.

The determining unit 538 can set more judgment conditions to make the judgments of the sync pattern more accurate. For example, when a condition of Cnt1>Cnt2>Cnt3 is true and an absolute value of (Cnt1−Cnt2−Cnt3) is smaller than a threshold, it represents that the sync pattern of the BCA signal is detected.

Take FIG. 6 as an example, after the three sequential counting values Cnt1, Cnt2, and Cnt3 respectively equaling 40, 19, and 51, are received by the determining unit 538, a first judgment (I) can be performed. Since the ratio of the three sequential counting values Cnt1, Cnt2, and Cnt3 is approximately 4:2:5, the BCA signal is determined to have no sync pattern. Otherwise, since the condition that Cnt1>Cnt2>Cnt3 is not true, the BCA signal is determined to have no sync pattern.

After that, when a next counting value is received by the determining unit 538, the determining unit 538 discards the old Cnt1 by reference to a first-in-first-out manner. At this time, the three sequential counting values Cnt1, Cnt2, and Cnt3 are respectively equal to 19, 51, and 28, and a second judgment (II) can be performed. Since the ratio of the three sequential counting values Cnt1, Cnt2, and Cnt3 is approximately 2:5:3, the BCA signal is determined to have no sync pattern. Otherwise, since the condition that Cnt1>Cnt2>Cnt3 is not true, the BCA signal is determined to have no sync pattern.

Afterwards, when a next counting value is received by the determining unit 538 again, the determining unit 538 discards the old Cnt1 by reference to a first-in-first-out manner. At this time, the three sequential counting values Cnt1, Cnt2, and Cnt3 are respectively equal to 51, 28, and 21, and a third judgment (III) can be performed. Since the ratio of the three sequential counting values Cnt1, Cnt2, and Cnt3 is approximately 5:3:2, the BCA signal is determined to have the sync pattern. Assume that the threshold is set as 5. Since the condition that Cnt1>Cnt2>Cnt3 is true and the absolute value of (Cnt1−Cnt2−Cnt3) is smaller than the threshold (i.e., Cnt1−Cnt2−Cnt3=51−28−21=2<5), the BCA signal is determined to have the sync pattern.

Similarly, the sync pattern is not detected in the BCA signal during a fourth judgment (IV) and a fifth judgment (V).

As can be known from the above-mentioned descriptions, the BCA signal is determined to have the sync pattern when the third judgment (III) is performed by the determining unit 538. After that, the determining unit 538 is capable of outputting the channel bit length counting value according to the received counting values. For example, a calculating result equaling 10.5 can be obtained from dividing the third counting value Cnt3 representative of 2 T by 2 via the determining unit 538, and then the calculating result equaling 10.5 is set as the channel bit length counting value to be outputted. Or another calculating result equaling 9.875 can be obtained from dividing a sum of the first counting value Cnt1 and the second counting value Cnt2 representative of 8 T by 8 (i.e., [51+28]/8=9.875), and then the calculating result equaling 9.875 is set as the channel bit length counting value to be outputted. Or another calculating result equaling 10 can be obtained from dividing a sum of the first counting value Cnt1, the second counting value Cnt2, and the third counting value Cnt3 representative of 10 T by 10 (i.e., [51+28+21]/10=10), and then the calculating result equaling 10 is set as the channel bit length counting value to be outputted. Similarly, by reference to the calculating result obtained from dividing a sum of the second counting value Cnt2 and the third counting value Cnt3 representative of 5 T by 5, by reference to the calculating result obtained from dividing a sum of the first counting value Cnt1 and the third counting value Cnt3 representative of 7 T by 7, by reference to the calculating result obtained from dividing the first counting value Cnt1 representative of 5 T by 5, or by reference to the calculating result obtained from dividing the second counting value Cnt2 representative of 3 T by 3, the channel bit length counting value can be obtained. In other words, the manner for obtaining the channel bit length counting value is not limited in the present invention.

Therefore, when the clock cycle of the reference clock $CLK_{ref}$ is multiplied by the channel bit length counting value by using the channel clock recovery device 540, a period of the channel bit representative of 1 T can be obtained and the channel clock can be recovered. After that, the data demodulator 550 is capable of transferring the BCA signal into the BCA data according to the channel clock.

That is, the mechanism disclosed in the present invention can detect the sync pattern of the BCA signal and can simultaneously generate the channel clock when the sync pattern is detected, so that the data demodulator is capable of immediately demodulating the BCA signal to generate the BCA data.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for detecting a burst cutting areas on an optical disc, comprising:
    an optical pickup head, for emitting a laser beam to the burst cutting area of the optical disc and obtaining a radio frequency signal;
    a front-end processing unit, for receiving the radio frequency signal and for generating a BCA signal in response to the radio frequency signal;
    a sync pattern detector, for counting the BCA signal according to a reference clock and capable of detecting a sync pattern of the BCA signal and outputting a channel bit length counting value;
    a channel clock recovery device, for receiving the reference clock and the channel bit length counting value and for generating a channel clock according to the reference clock and the channel bit length counting value; and
    a data demodulator, for receiving the channel clock and the BCA signal and for transferring the BCA signal into a BCA data according to the channel clock;
    wherein the sync pattern detector is capable of continuously counting the BCA signal and continuously outputting a first counting value, a second counting value and a third counting value, so that the sync pattern of the BCA signal is able to be determined by the sync pattern detector when the first counting value is greater than the second counting value, the second counting value is greater than the third counting value and an absolute value obtained from subtracting the second counting value and the third counting value from the first counting value is smaller than a threshold.

2. The apparatus for detecting a burst cutting area on an optical disc of claim 1, wherein the sync pattern detector comprises:
    a counter, for continuously counting the BCA signal according to the reference clock and continuously outputting a plurality of counting values; and
    a determining unit, for sequentially setting the last three received counting values as the first counting value the second counting value and the third counting value, and for determining the sync pattern of the BCA signal according to a relationship between the first counting value, the second counting value and the third counting value.

3. The apparatus for detecting a burst cutting area on an optical disc of claim 2, wherein when a ratio of the first counting value, the second counting value and the third counting value is equal to 5:3:2, the sync pattern detector determines that the BCA signal has the sync pattern.

4. The apparatus for detecting a burst cutting area on an optical disc of claim 3, wherein when the sync pattern is determined, a calculating result obtained from dividing the first counting value by 5 is used as the channel bit length counting value; or a calculating result obtained from dividing the second counting value by 3 is used as the channel bit length counting value; or a calculating result obtained from dividing the third counting value by 2 is used as the channel bit length counting value; or a calculating result obtained from dividing a sum of the first counting value and the second counting value by 8 is used as the channel bit length counting value; or a calculating result obtained from dividing a sum of the first counting value and the third counting value by 7 is used as the channel bit length counting value; or a calculating result obtained from dividing a sum of the second counting value and the third counting value by 5 is used as the channel bit length counting value; or a calculating result obtained from dividing a sum of the first counting value, the second counting value and the third counting value by 10 is used as the channel bit length counting value.

5. The apparatus for detecting a burst cutting area on an optical disc of claim 3, wherein when the sync pattern is determined, a calculating result obtained from dividing a sum of the first counting value, the second counting value and the third counting value by 10 is used as the channel bit length counting value.

6. A method for detecting a burst cutting area on an optical disc, comprising:

receiving a radio frequency signal from the burst cutting area;

processing the radio frequency signal to generate a BCA signal in response to the radio frequency signal;

continuously sampling the BCA signal according to a reference clock, and continuously outputting a first counting value, a second counting value and a third counting value; and determining a sync pattern of the BCA signal according to a relationship between the first counting value, the second counting value and the third counting value;

wherein the sync pattern is determined when the first counting value is greater than the second counting value, the second counting value is greater than the third counting value, and an absolute value obtained from subtracting the second counting value and the third counting value from the first counting value is smaller than a threshold.

7. The method for detecting a burst cutting area on an optical disc of claim 6, further comprising:

when the sync pattern is detected, calculating a channel bit length counting value according to the first counting value, the second counting value and the third counting value; and generating a channel clock according to the channel bit length counting value and the reference clock.

8. The method for detecting a burst cutting area on an optical disc of claim 7, wherein when a ratio of the first counting value, the second counting value and the third counting value is equal to 5:3:2, determining that the BCA signal has the sync pattern.

9. The method for detecting a burst cutting area on an optical disc of claim 7, wherein when the sync pattern is determined, a calculating result obtained from dividing the first counting value by 5 is used as the channel bit length counting value; or a calculating result obtained from dividing the second counting value by 3 is used as the channel bit length counting value; or a calculating result obtained from dividing the third counting value by 2 is used as the channel bit length counting value; or a calculating result obtained from dividing a sum of the first counting value and the second counting value by 8 is used as the channel bit length counting value; or a calculating result obtained from dividing a sum of the first counting value and the third counting value by 7 is used as the channel bit length counting value; or a calculating result obtained from dividing a sum of the second counting value and the third counting value by 5 is used as the channel bit length counting value; or a calculating result obtained from dividing a sum of the first counting value, the second counting value and the third counting value by 10 is used as the channel bit length counting value.

10. The method for detecting a burst cutting area on an optical disc of claim 7, wherein when the sync pattern is determined, a calculating result obtained from dividing a sum of the first counting value, the second counting value and the third counting value by 10 is used as the channel bit length counting value.

11. The method for detecting a burst cutting area on an optical disc of claim 7, further comprising:

demodulating the BCA signal to generate a BCA data according to the channel clock.

\* \* \* \* \*